(12) United States Patent
Bombino

(10) Patent No.: US 10,480,685 B2
(45) Date of Patent: Nov. 19, 2019

(54) LOWERING BUOYANT STRUCTURES IN WATER

(71) Applicant: Acergy France SAS, Suresnes (FR)

(72) Inventor: Stephane Bombino, Suresnes (FR)

(73) Assignee: Acergy France SAS, Suresnes (FR)

(*) Notice: Subject to any disclaimer, the term of this patent is extended or adjusted under 35 U.S.C. 154(b) by 0 days.

(21) Appl. No.: 15/551,889

(22) PCT Filed: Feb. 11, 2016

(86) PCT No.: PCT/IB2016/000341
§ 371 (c)(1),
(2) Date: Aug. 17, 2017

(87) PCT Pub. No.: WO2016/132229
PCT Pub. Date: Aug. 25, 2016

(65) Prior Publication Data
US 2018/0073665 A1    Mar. 15, 2018

(30) Foreign Application Priority Data

Feb. 18, 2015   (GB) .................................. 1502725.3

(51) Int. Cl.
*B63B 35/44* (2006.01)
*B63B 43/06* (2006.01)
(Continued)

(52) U.S. Cl.
CPC ................. *F16L 1/163* (2013.01); *F16L 1/24* (2013.01)

(58) Field of Classification Search
CPC .......... B63B 35/44; B63B 43/06; E02B 17/02; E02B 2017/0082; F16L 1/24
(Continued)

(56) References Cited

U.S. PATENT DOCUMENTS 3,045,623 A * 7/1962 Tyler .......................... B63C 7/04
114/333
3,158,994 A * 12/1964 Hodgson ................. C06B 27/00
114/20.1
(Continued)

FOREIGN PATENT DOCUMENTS

GB          2 201 220      8/1988
WO      WO 2010/012896    2/2010
(Continued)

*Primary Examiner* — Benjamin F Fiorello
*Assistant Examiner* — Edwin J Toledo-Duran
(74) *Attorney, Agent, or Firm* — Levy & Grandinetti

(57) ABSTRACT

A method lowers a hollow structure through water and installs that structure at a subsea location. The structure has an internal space containing a ballast material such as sea salt that is substantially denser than water. Upon being lowered with the aid of the ballast material to a subsea destination, the structure is anchored at that destination. Then, water is introduced into the internal space to dissolve, suspend or dilute the ballast material. Thus dissolved, suspended or diluted, the ballast material is evacuated or dispersed from the internal space in a liquid or fluidized form. For example, a solution or suspension of the ballast material can be entrained in a flushing flow of water through and from the internal space. The internal space is then available to perform another, primary function in subsea operation of the structure, for example as a flowline to convey oil or gas.

14 Claims, 3 Drawing Sheets

Figure 1:
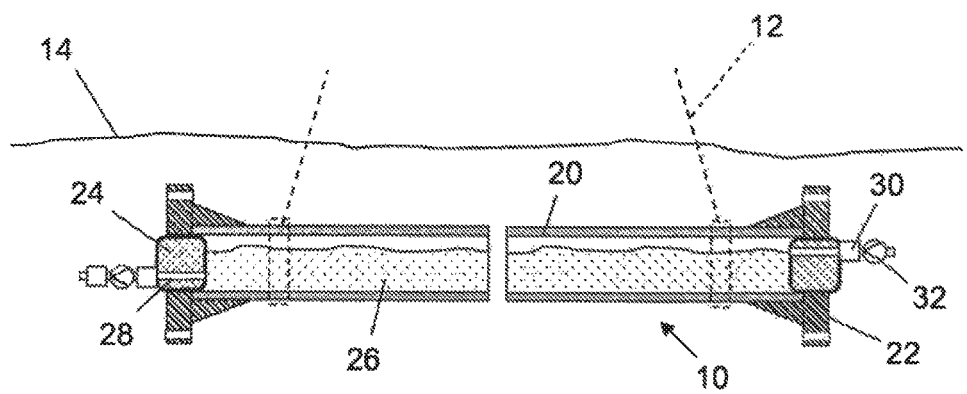

(51) Int. Cl.
*E02B 17/02* (2006.01)
*F16L 1/24* (2006.01)
*F16L 1/16* (2006.01)

(58) Field of Classification Search
USPC .............. 114/312, 326–329, 331, 121, 124; 405/158, 171, 200, 203–210
See application file for complete search history.

(56) References Cited

U.S. PATENT DOCUMENTS

| | | | | |
|---|---|---|---|---|
| 3,220,372 A * | 11/1965 | Lehmann | ........... | B63B 35/28 114/321 |
| 3,314,174 A * | 4/1967 | Haggard | ........... | E02F 3/081 37/313 |
| 3,415,068 A * | 12/1968 | Casey, Jr. | ........... | E02F 7/005 37/313 |
| 3,667,415 A * | 6/1972 | Robbins, Jr. | ........... | B63G 8/22 114/333 |
| 3,697,134 A * | 10/1972 | Murray | ........... | E02F 3/88 299/8 |
| 3,756,034 A | 9/1973 | Lochridge et al. | | |
| 3,812,922 A * | 5/1974 | Stechler | ........... | B63C 7/08 175/6 |
| 3,975,054 A * | 8/1976 | Brockett, III | ........... | E02F 3/92 299/8 |
| 4,010,560 A * | 3/1977 | Diggs | ........... | E02F 3/082 37/308 |
| 4,193,057 A * | 3/1980 | Bennett | ........... | G10K 11/008 367/153 |
| 4,231,171 A * | 11/1980 | Balligand | ........... | B63B 35/40 114/313 |
| 4,232,903 A * | 11/1980 | Welling | ........... | E02F 3/8858 299/8 |
| 4,274,333 A * | 6/1981 | Lampton | ........... | F42B 22/10 102/411 |
| 4,336,662 A * | 6/1982 | Baird | ........... | E02F 5/006 37/314 |
| 4,343,098 A * | 8/1982 | Balligand | ........... | B63B 35/40 114/259 |
| 4,357,764 A * | 11/1982 | Lemercier | ........... | B63B 3/13 114/313 |
| 4,368,923 A * | 1/1983 | Handa | ........... | E02F 3/92 299/8 |
| 4,446,636 A * | 5/1984 | Weinert | ........... | E02F 7/005 37/195 |
| 4,448,145 A * | 5/1984 | Hervieu | ........... | B63C 11/34 114/312 |
| 4,498,408 A * | 2/1985 | Otteblad | ........... | B63C 7/10 114/52 |
| 4,717,092 A * | 1/1988 | Cameron | ........... | A63H 27/085 116/210 |
| 4,722,498 A * | 2/1988 | Cameron | ........... | A63H 27/085 116/210 |
| 4,940,021 A * | 7/1990 | Rytand | ........... | E02B 3/064 114/263 |
| 5,328,250 A * | 7/1994 | Upright | ........... | E02F 7/005 299/8 |
| 6,357,966 B1 | 3/2002 | Thompson | | |
| 6,371,041 B1 * | 4/2002 | Ness | ........... | B63G 8/001 114/312 |
| 6,860,219 B1 * | 3/2005 | Dempster | ........... | B63B 21/22 114/264 |
| 7,856,938 B2 * | 12/2010 | Marion | ........... | B63B 43/12 114/312 |
| 8,385,155 B2 * | 2/2013 | Stacey | ........... | H04B 11/00 367/157 |
| 8,997,678 B2 * | 4/2015 | Spickermann | ........... | B63C 7/08 114/326 |
| 2002/0178989 A1 * | 12/2002 | Nelson | ........... | B63B 35/4406 114/265 |
| 2005/0277347 A1 | 12/2005 | Quigley et al. | | |
| 2007/0221112 A1 | 9/2007 | Haney et al. | | |
| 2010/0065508 A1 * | 3/2010 | Bolan | ........... | B01D 35/05 210/747.6 |
| 2011/0010967 A1 * | 1/2011 | Howard | ........... | E02F 5/006 37/313 |
| 2013/0206049 A1 * | 8/2013 | Spickermann | ........... | B63C 7/08 114/321 |

FOREIGN PATENT DOCUMENTS

| | | |
|---|---|---|
| WO | WO 2012/072991 | 6/2012 |
| WO | WO 2013/120065 | 8/2013 |
| WO | WO 2014/023943 | 2/2014 |
| WO | WO 2015/049348 | 4/2015 |

* cited by examiner

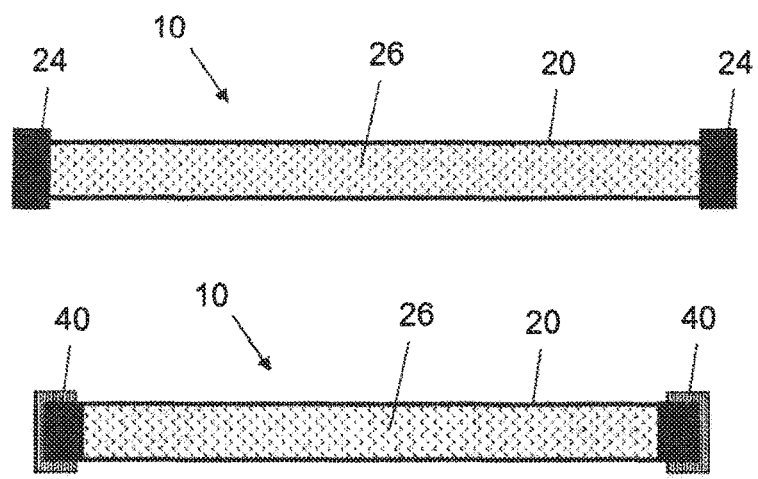
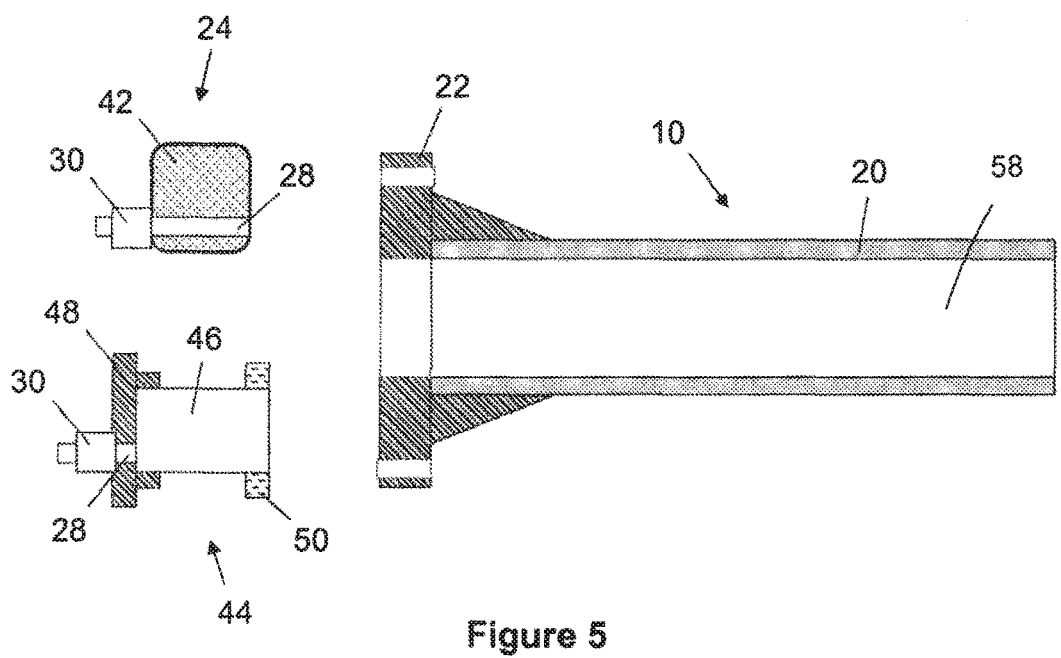
Figure 4
Figure 5

LOWERING BUOYANT STRUCTURES IN WATER

This invention relates to the challenges of lowering buoyant structures in water, particularly hollow items such as pipes or other tubular members made of composite materials or plastics. Such structures are used increasingly in subsea installations for the production of oil and gas. They are characterised by excessive buoyancy, meaning that they have positive buoyancy, neutral buoyancy or only slightly negative buoyancy in seawater. This makes them difficult to lower through water in a quick and controlled manner.

Historically, steel and concrete have been used for hollow structures in deep-water subsea installations because of their resistance to compressive stress under hydrostatic pressure, which increases by approximately 1 bar every 10 meters and so may exceed 100 bar in deep water. Weaker plastics materials have also been used historically in subsea installations, but generally only for coating or lining other structures to resist corrosion and for thermal insulation.

In recent years, the mechanical strength and durability of composite materials has been improved by developing fibre reinforcements and polymer matrices in which those fibres are embedded. More efficient production techniques have also been developed so that the whole-life cost of structures made from improved structural composite materials has become more competitive with the cost of equivalent steel or concrete structures.

A contemporary example of a composites structure for subsea use is a pipe of composite material sold by Magma Global Limited under the registered trade mark 'm-pipe'. The tubular wall of that pipe contains glass fibres and carbon fibres as reinforcements in a polymer matrix of polyether ether ketone (PEEK). Its light weight, high strength and resistance to external corrosion, internal chemical attack and fatigue loading make 'm-pipe' attractive for some demanding subsea applications.

More generally, improved polymers, and especially polymer-based composite materials, are increasingly being considered as structural materials for subsea applications. Examples of subsea applications include pipelines or pipe bundles, structural members such as beams and other structures such as foundation mats.

There is a distinction between 'composite materials' and 'composite structures', meaning that those terms are not synonymous.

Composite materials (often shortened to 'composites') are materials made from two or more component materials with different but complementary properties. The composite nature of a composite material is intrinsic to that material itself. The component materials remain distinct from each other in the composite material but, when working together, the component materials confer characteristics on the composite material that are different from those of the individual component materials.

An example of a composite material is a reinforced plastics material such as a fibre-reinforced polymer, being a combination of reinforcing fibres embedded in a matrix of polymer. WO 2012/072991 discloses an example of a composite material used for a pipeline application.

In contrast, composite structures are structures made of two or more components of different materials. The material of each component is chosen to perform the function of that component and to optimise the structure as a whole. Examples of composite structures used in the subsea oil and gas industry are a layered flexible pipe or a lined or coated rigid pipe, each of which typically comprises one or more components of carbon steel and one or more other components of different materials such as polymers or corrosion-resistant alloys. The composite structure may include one or more components made of composite materials, but not necessarily so. Thus, the composite nature of a composite structure is extrinsic to any of the materials from which the components of that structure are made.

A composite structure is therefore a non-homogeneous assembly of elements of different materials with different properties, such as a sandwich of layers in a multi-layered structure. For example, WO 2010/012896 discloses a composite structure in the form of an unbonded flexible pipe, in which a first, plastics layer is covered by a metallic carcass or vault, then by a succession of wound metallic wires and plastics layers.

The low density of polymer composite materials is both an advantage and a drawback. Low density is a major advantage for handling large structures such as long pipe sections because it greatly reduces their weight in air and in water. However, that lack of weight is a significant drawback when the structure has to be lowered in water, especially in dense seawater, as its excessive buoyancy must then be overcome.

It is, of course, common knowledge to add weight to a structure to lower it in water. A crude approach, like that used in a bathyscaphe, is to attach ballast weights to a positively buoyant structure to make it, temporarily, negatively buoyant for lowering from the surface, and then to eject or jettison the ballast weights to regain positive buoyancy for returning to the surface.

U.S. Pat. No. 6,357,966 describes a method for installing an underwater pipeline wherein the pipeline has one or more ballast tubes attached to the pipeline around specifically shaped ballast weights designed to impart the minimal amount of ballast weight necessary for sinking the pipeline to the seabed. The final ballast weight is achieved after the pipeline has been positioned on the seabed by filling the ballast tubes with a substance that possesses a relative density greater than water.

Ejectable or jettisonable ballast weight may be of one or more solid bodies of material such as a metal like steel or a solid particulate material such as sand or salt. In view of environmental concerns, WO 2013/120065 teaches the use of soluble sea salt, being predominantly sodium chloride with a specific density of 2.17, as a ballast weight for an underwater vehicle that is used to mine the seabed. When it is necessary to compensate for the increasingly negative buoyancy of the vehicle as it loads itself with mined minerals, the salt is ejected intermittently from a hopper by an ejection mechanism comprising a screw or impeller. To ease ejection, the salt is formed into balls of about 5 cm in diameter.

As partial dissolution of the salt when in the hopper could cause the ejection mechanism of WO 2013/120065 to clog, premature dissolution before ejection is prevented by coating the salt balls with a slowly-dissolving barrier layer. The barrier layer remains intact until the ejected salt balls have been on the seabed for some time, whereupon the salt can dissolve relatively quickly to minimise environmental damage. Thus, the salt balls remain solid while they serve as ballast and while they are being ejected.

GB 2201220 describes a method for ejecting ballast (e.g. water) from ballast chambers within a pipe body. In particular, the cross-sectional area of the ballast chambers is reduced due to gas pressure in the area surrounding the chambers, thereby pressing or squeezing the ballast medium out of the chambers.

Another way to control lowering of a structure in water is to add a buoyant, gas-based ballasting system to support a structure that is, intrinsically, negatively buoyant. Water is used to flood a ballast tank, thereby to increase the apparent weight of the structure in the water in which it is immersed, until negative buoyancy causes the structure to sink. High-pressure air purges water from the ballast tank to regain neutral or positive buoyancy so that the structure can remain at a set depth or, eventually, float back on the surface. This is the well-known principle of operation of a submarine.

All of the above solutions are needlessly complex and costly for subsea installation of equipment that is to be lowered only once for long-term connection to anchoring points on or near the seabed. If used in such applications, such ballasting systems would effectively be redundant after a single use.

When a subsea structure is hollow like a closed pipeline or a closed tubular section, it is known to use the hollow internal space of the structure to adjust the overall buoyancy of the structure for transportation and lowering. For example, the internal space may be filled with air for towing across the surface or in mid-water to an installation site and, once there, flooded with water to add weight for lowering. Then, after installation subsea at a lowered position, the water may be purged or displaced from the space with air or other gas or liquid.

U.S. Pat. No. 3,756,034 describes a method for laying subsea pipelines, and specifically relates to the use of various articulated buoyancy chambers within the pipeline for supporting the length of pipeline that extends between the seabed and a floating pipe-laying vessel.

Purging the ballasting water allows the internal space of the structure to be dual-purpose, being used temporarily to adjust buoyancy during transportation, lowering and installation and then, after installation and commissioning, being used permanently for its primary purpose of, for example, conveying fluids such as oil or gas. Again, however, such flooding and purging systems add complexity and cost that is excessive for equipment that needs to be lowered only once and is then left underwater to operate.

Additionally, any buoyancy-control solution that relies upon a set volume of gas to be trapped within a hollow space requires the structure defining the space, such as the walls of a tank or a pipe, to be strong enough to resist collapse under increasing hydrostatic pressure with depth.

A hollow lightweight structure with substantial content of polymers or composites is highly positively buoyant in water when that structure is filled with air. Even if entirely flooded with water instead, the apparent weight of such a structure may not be sufficient for quick and controlled lowering, especially in high sea states or in strong currents. In particular, flooding very light structures such as solid rigid pipelines of composites or unbonded flexible pipelines comprising polymers may merely bring the structure close to neutral buoyancy, which does not allow satisfactory lowering. Consequently, additional clump weights or other denser-than-water ballast materials must be added to or incorporated into the structure.

Where a structure is a short section of composites pipe, polymer pipe or unbonded flexible pipe, forged steel end fittings of the pipe may serve as inbuilt ballast to enable the structure to sink quickly enough when flooded. An example of a metallic end-fitting for a composites pipe is disclosed in WO 2014/023943. Such fittings contribute sufficient weight that clump weights or other ballast may be unnecessary where the pipe is less than about 50 m in length, exemplified by a spool or a jumper for connecting spaced-apart elements of a seabed installation. However, where such a pipe is longer than about 50 m, the greater relative volume of the lightweight pipe wall to the denser steel of the end fittings means that clump weights or other ballast are likely to be required. This adds cost and complexity to the system and to the installation method.

Against this background, the invention recognises that a hollow internal space of a lightweight structure may be used beneficially to increase the apparent weight of the structure in water if that space contains a ballast material that is denser than water. However, this presents a problem, namely that if that space is a dual-purpose space to be used for another, primary purpose after installation—such as the interior of a flowline used to convey oil or gas—the ballast has to be ejected from the space before it can be so used.

The aforementioned WO 2013/120065 discusses some of the problems of ejecting ballast material from a space. It will be noted that ejecting ballast from a space is challenging, even if that space has a single purpose; namely to hold ejectable ballast in a manner that will ease its ejection when required. In this respect, specialist ballast hoppers like that WO 2013/120065 may rely to some extent upon gravity to promote the flow of ballast material during ejection but even so, they require an ejection mechanism to drive the ballast material into the water.

It will be clear that a dual-purpose space such as a flowline, being a long, narrow, horizontally-extending space that is open only at its ends, is especially ill-adapted to facilitate ejection of a solid ballast material from within that space. This applies even if the ballast material is in a particulate or divided form like that of WO 2013/120065.

The present invention proposes a simple solution to reduce or avoid additional ballasting of hollow lightweight structures such as composite pipeline sections for lowering them through the water column.

Broadly, the inventive concept resides in a method of lowering and installing a structure whose apparent weight in water is increased by, temporarily, carrying a ballast material that is substantially denser than water. The structure is anchored at a subsea location while still carrying the ballast material. At the subsea location, the ballast material is exposed to water, preferably a flushing flow of water, to dissolve, suspend or dilute the ballast material that was initially carried by the anchored structure, and to transport the dissolved, suspended or diluted ballast material away from the anchored structure. This enables the part of the anchored structure that carried the ballast material to perform its primary function at the subsea location, as distinct from its secondary function of carrying the ballast material for the purpose of lowering the structure to the subsea location.

The invention may, for example, be expressed as a method of lowering a hollow structure through water and installing that structure at a subsea location. The structure has an internal space containing a ballast material that is substantially denser than water. Upon being lowered with the aid of the ballast material to a subsea destination such as the seabed, the structure is anchored at that destination. For example, the structure may be coupled to a subsea installation or between two items of subsea equipment on the seabed to connect them. Then, water is introduced into the internal space to dissolve, suspend or dilute the ballast material.

Thus dissolved, suspended or diluted in the introduced water, the ballast material is evacuated or dispersed from the internal space in a liquid or fluidised form. For example, a solution or suspension of the ballast material may be entrained in a flushing flow of water through and from the internal space. The internal space is then available to perform another, primary function in subsea operation of the structure, for example as the interior of a flowline to convey oil or gas.

Where the structure per se has positive or neutral buoyancy without the ballast material, the ballast material is suitably present in sufficient quantity as to confer substantial negative buoyancy upon the structure as a whole, including the ballast material.

The ballast material may be a solid and preferably a particulate solid, such as loose or compacted powder or granular material. For example, an internal space of the structure may be packed with the ballast material. The ballast material may be substantially dry before being exposed to the water that dissolves, suspends or dilutes it. Alternatively, the ballast material may already be wet before being exposed to additional water that dissolves, suspends or dilutes it. In principle, a ballast of dense water-based liquid or semi-liquid material such as wet mud, wet clay or highly concentrated or saturated brine would be possible, if suitably contained. Thus, a liquid or semi-liquid ballast material may be thick and viscous with the consistency of a paste or slurry.

The ballast material is preferably soluble or capable of being diluted in water. This allows the ballast material to disperse and diffuse from the internal space even with little or no flow of water through the internal space. Also, a soluble ballast material leaves no solid waste in the water or on the seabed and can eventually disperse in the water to a vanishingly small concentration.

Creating a flow of water through the internal space is preferred to accelerate dissolution, emptying and dispersion of ballast material from the internal space. A fast and preferably swirling or turbulent flow of water through the internal space may be advantageous, particularly to agitate, suspend and carry a suspension of a insoluble fine-particle ballast material such as mud or clay, without allowing the suspended particles to settle back out of the flow until the flow has exited the internal space.

Some of the ballast material could be cleared from the internal space by mechanical means. An example of such means is a wiper or a pig moving along the cylindrical interior of a pipe to force any remaining ballast material through an opening leading from the internal space into the surrounding water, such as the open end of a pipe.

A body of ballast material is suitably exposed to the introduced water flowing along one or more flow paths. Water following the or each flow path in contact with the ballast material may run past or through the body of ballast material. The introduced water dissolves, disperses or suspends the ballast material into a liquid or fluidised form and then entrains and carries the dissolved, dispersed or suspended ballast material away, for example out of an internal space containing the ballast material.

The composition or concentration of the effluent fluid exiting a ballasted internal space may be sensed, for example with a salinity sensor if the ballast material is salt, to measure the progress of evacuation or dispersal of the ballast material. This allows an operator to determine when the ballast material has been adequately rinsed or flushed from the structure and so to decide that the structure is ready for further preparation to perform its primary purpose.

Common salt, sodium chloride, is preferred as the ballast material, most conveniently in the form of sea salt in which sodium chloride predominates among other trace minerals. Sea salt has substantial density and presents no environmental risk when flushed by seawater.

Access of surrounding water to the ballast material may be blocked in various ways before the structure reaches the subsea location. For example, one or more barriers such as a cap, plug, cover or other closure that closes a space containing the ballast material may be opened, dissolved, penetrated or removed after the structure is anchored at the subsea location. One or more valves may control a flow of water through such a barrier, being opened when the structure is anchored at the subsea location to expose the ballast material to the water surrounding the structure.

Barriers may also protect parts of the structure from damage by the ballast material, such as the corrosive effect of a concentrated solution of salt upon parts made of steel. For example, where the structure is a tubular structure such as a composites pipe whose interior contains the ballast, end plugs or male formations of end caps may extend into the ends of the pipe by at least the depth of the steel end fittings of the pipe, to serve as barriers between the end fittings and the ballast. Conveniently such barriers may also serve as the aforementioned barriers that selectively block access of water to the ballast material before the structure reaches the subsea location.

One or more pumps or impellers may drive a flow of water across or through the ballast material to force flushing of that material. There may be an inlet pump on an inlet side of a flow path across or through the ballast material carried by the structure to draw water toward that ballast material and/or an outlet pump on an outlet side of the flow path to draw water carrying the ballast material away from the structure. For example, where the structure is a tubular structure such as a composites pipe, a pump may be provided at one or both ends of the pipe.

Thus, in preferred embodiments, the invention involves filling a light polymer-based hollow item with packed solid material that that is denser than seawater and that can dissolve on contact with seawater. Then the item is lowered into the sea until it reaches the seabed, where it is anchored or connected to static points such as pre-installed connectors, and then flooded and rinsed by seawater. More generally, the invention involves temporarily increasing the weight in water of naturally buoyant hollow polymer-based equipment by: filling the equipment with a dense solid soluble material; temporarily closing one or more openings or ends of the equipment with a cap, plug or other barrier; lowering the equipment in water; mechanically anchoring the equipment to at least one fixed subsea point; and then opening each cap, plug or other barrier. Opening of a cap or plug may, for example, be achieved by uncoupling it from the equipment or by opening at least one valve connected to a traversing bore through the cap or plug.

The invention is especially convenient for use with composite pipelines, preferably those longer than about 50 m, which are lighter than either rigid steel pipelines or unbonded flexible pipelines. Composite pipelines do not contain steel that could corrode due to the ballast material, except at the end fittings that can be locally coated, treated or otherwise protected to avoid corrosion.

Figure 2:
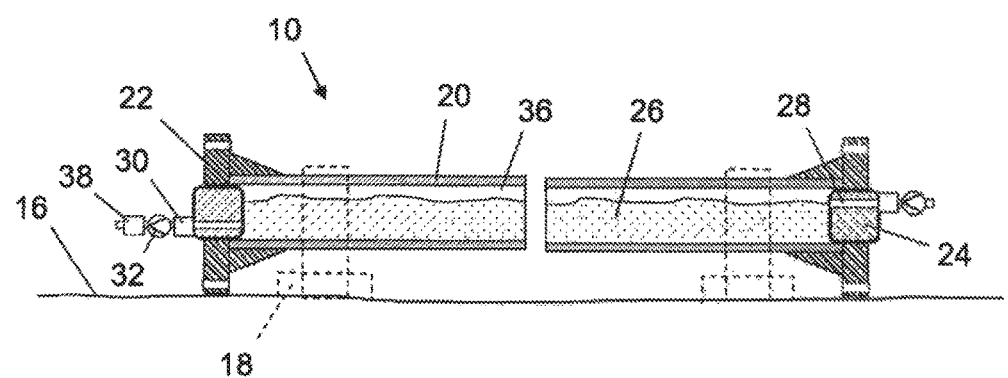
Figure 3:
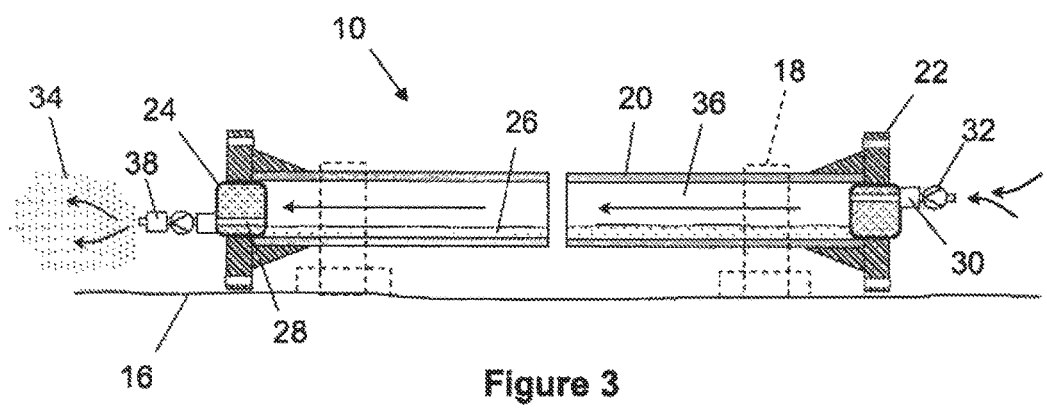
Figure 6:
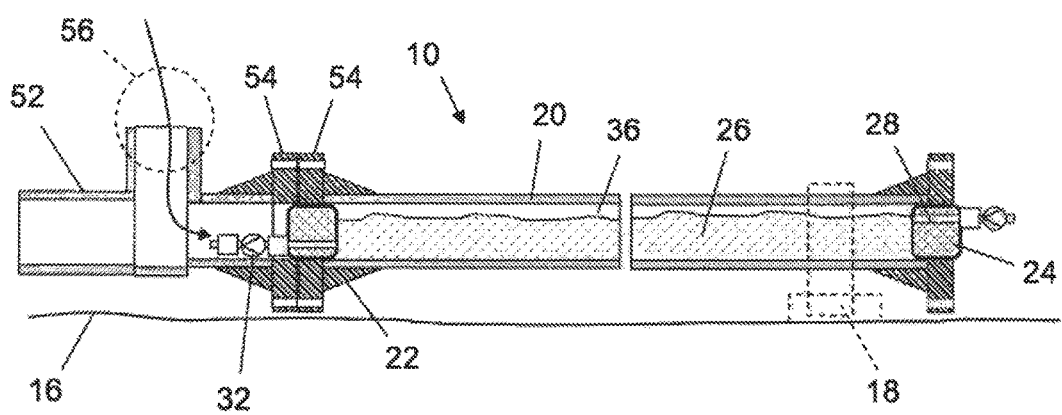

In order that the invention may be more readily understood, reference will now be made, by way of example, to the accompanying drawings in which:

FIGS. 1 to 3 are a series of schematic sectional side views of a subsea structure being lowered from the surface and installed on the seabed in accordance with the invention;

FIG. 4 contains schematic sectional side views of two variants of closures for a subsea structure of the invention;

FIG. 5 is an enlarged detail view of a subsea structure of the invention, showing in detail two variants of closures that can be used with that structure; and FIG. 6 is a schematic sectional side view of a further variant of the invention showing another way of anchoring the structure at a subsea location.

FIGS. 1 to 3 show an elongate hollow structure exemplified here as a composite pipe 10 that may, for example, measure substantially more than 50 m in length from end to end. Before the stages shown in FIGS. 1 to 3, the pipe 10 has been transported to an installation location, for example by towing. In conventional manner, the pipe 10 may have been supported during towing by external floats or buoys, which have now been removed, and/or by internal buoyancy provided by gas sealed in its internal cavity.

The pipe 10 is shown in FIG. 1 suspended by rigging 12 near the surface 14 of the sea. The rigging 12 hangs from a crane or winch of an installation vessel (not shown) floating on the surface 14. The pipe 10 is shown in FIGS. 2 and 3 having been lowered to a subsea location, in this example the seabed 16, and held there by pre-installed anchoring structures 18.

The pipe 10 has a tubular wall 20 of a composite material such as fibre-reinforced polymer and is terminated by steel end fittings 22 in conventional manner. Each end fitting 22 is closed by a respective plug 24 that extends into the pipe 10 by the depth of the end fitting 22. The plugs 24 may be fixed to the pipe 10 or removable from the pipe 10, to be removed by, for example, ROV or diver intervention on the seabed 16. After removal, the plugs 24 may be reused on like structures during subsequent transportation and installation operations.

The interior of the pipe 10 between the plugs 24 contains a mass of sea salt 26 as an example of a ballast material that is substantially denser than seawater. The salt 26 may be a wet slurry, a highly-concentrated or saturated brine, a dry powder or of other particulate form. The salt 26 may fill most but not necessarily all of the internal diameter of the pipe 10, provided that there is a sufficient weight of ballast that the ballasted pipe 10 has the desired degree of negative buoyancy. Without ballast, the pipe 10 per se has positive buoyancy, neutral buoyancy or insufficiently negative buoyancy for ease of subsea lowering and installation.

Ballast material in accordance with the invention may be added to the pipe 10 offshore, suitably after transportation, or onshore before transportation.

Each plug 24 is penetrated by a respective port or flow channel 28 leading from the interior of the pipe 10 to the surrounding sea. A valve 30 on each plug 24 controls the flow of seawater along the associated flow channel 28. The valves 30 remain closed while the pipe 10 is lowered to the seabed 16, to keep seawater out of the interior of the pipe 10 and hence out of contact with the salt 26 within.

After the pipe 10 has been anchored at the seabed 16 as shown in FIG. 2, the valves 30 are opened to allow seawater to flow along the flow channels 28 into and out of the interior of the pipe 10 as shown in FIG. 3. Inflowing seawater dissolves and entrains the salt 26 within the pipe 10. Outflowing seawater carries the dissolved salt 26 out of the pipe 10 to be dispersed in the surrounding sea.

In principle, it would be possible to clear the salt 26 from the pipe 10 by opening the valves 30 or even by removing the plugs 24 to open the ends of the pipe 10, in which latter case the valves 30 and flow channels 28 would be unnecessary. Over time, incoming seawater will dissolve, diffuse and disperse the salt 26, possibly with the assistance of natural currents in the sea.

Preferably, however, a flow of seawater is driven along the interior of the pipe 10 to accelerate and assure dissolution and dispersal of the salt 26. Thus, when the valves 30 are open, respective pumps 32 are activated to propel seawater along the flow channels 28 of the plugs 24.

The pump 32 of one plug 24 at one end of the pipe 10 is an intake pump that draws seawater into the pipe 10 through the flow channel 28 of that plug 24. The pump 32 of the other plug 24 at the other end of the pipe 10 is an exhaust pump that draws seawater out of the pipe 10 and into the surrounding sea as an effluent 34 containing dissolved salt 26 and thus being of elevated salinity. The combined action of the pumps 32 creates an internal longitudinal flow of seawater in contact with the mass of salt 26 within the pipe 10 to dissolve and entrain the salt 26.

If the mass of salt 26 does not fill the full diameter of the pipe 10, a flow path 36 is left within the pipe 10 above, around or beside the mass of salt 26. This encourages seawater to flow without restriction along the flow path 36 in contact with the mass of salt 26, which flow helps to dissolve and disperse the salt 26 more effectively. The flow path 36 will expand as the salt 26 dissolves and is flushed from the pipe 10.

Preferably, as shown, the flow channel 28 of the plug 24 in at least the exhaust end of the pipe 10 is radially offset to a lower side of that plug 24. This promotes clearance of the salt 26 from within the pipe 10 through that flow channel 28. Conversely, the flow channel 28 of the plug 24 in the inlet end of the pipe 10 is suitably radially offset to an upper side of that plug 24 as shown, to direct the incoming flow of seawater into the flow path 36 above the mass of salt 26 within the pipe 10.

A salinity sensor 38 in the flow channel 28 of the plug 24 at the exhaust end of the pipe 10 senses the composition of the effluent 34 exiting the pipe 10. Signals from the salinity sensor 38 can be used to measure the progress of flushing the salt 26, as salinity will fall to the level of the surrounding seawater when no more salt 26 is being dissolved and entrained in the seawater flowing through the pipe 10.

Once the salt 26 has been flushed or rinsed from the interior of the pipe 10, the pipe 10 is ready to be prepared for performing its primary function such as to convey oil or gas. This may involve removing the plugs 24 by ROV or diver intervention to allow the pipe 10 to be connected to other subsea equipment. If some salt 26 remains in the pipe 10, it could be cleared mechanically before or after connection to other subsea equipment. For example, a pig (not shown) may be propelled to slide along the inside of the pipe 10 to force any remaining salt 26 out of the pipe 10.

FIG. 4 shows that the ends of the pipe 10 may be closed by plugs 24 that fit into the ends of the pipe 10 or by end caps 40 that surround the ends of the pipe 10. Details of the plugs 24 and end caps 40 such as valves 30 and flow channels 28 have been omitted from these simplified views.

FIG. 5 shows in more detail a plug 24 whose body 42 may be inflated to extend radially outwardly into sealing engagement with the internal surface of the pipe 10. The body 42 of the plug 24 suitably extends far enough into the pipe 10 to protect the steel end fittings 22 from corrosion due to exposure to a corrosive ballast material such as salt 26. The plug 24 is penetrated by a flow channel 28 in which a flow of seawater is controlled by a valve 30.

FIG. 5 also shows the alternative of an end cap 44 that has a tubular male skirt 46 extending orthogonally in a distal direction from a circular end plate 48. The skirt 46 extends far enough into the pipe 10 as to protect the end fittings 22 from corrosion. An inflatable seal 50 near the distal end of the skirt 46 extends circumferentially around and protrudes radially outwardly from the skirt 46 into sealing engagement with the internal surface of the pipe 10. This isolates the steel of the end fitting 22 from the salt 26 within the pipe 10. Again, the end plate 48 is penetrated by a flow channel 28 in which a flow of seawater is controlled by a valve 30.

Finally, FIG. 6 shows that the anchoring function of an anchoring structure 18 can alternatively be achieved by mechanical connection of an end fitting 22 at one or both ends of the pipe 10 to another subsea supporting structure, which may be pre-installed on the seabed 16. For example, such a structure may be an in-line tee (ILT) 52, to which a flange 54 of the end fitting 22 may be bolted. In this case, the plug 24 can be accessed, positioned or removed through a valve or port on a branch 56 extending transversely, suitably vertically, from the main existing horizontal branch of the ILT 52 as shown. A second plug 24 or a pig can isolate the existing horizontal branch during action on the plug 24.

Other variations are possible within the inventive concept. For example, as noted previously, other solid, particulate, liquid or semi-liquid ballast materials may be used instead of salt 26.

It may be possible to drive an adequate flow of seawater through the pipe 10 with just one pump 32 at one end of the pipe 10, if the other end of the pipe 10 is open to allow seawater to be drawn into or flushed out of the pipe 10 as appropriate.

One or both of the flow channels 28 of plugs 24, caps or other closures could be used to introduce a flowable liquid or fine particulate ballast material into the interior of the pipe 10.

Access of surrounding seawater to the ballast material may be blocked by other barriers such as caps or covers that temporarily close a space 58 containing the ballast material. Such a barrier may define at least part of an enclosure for the ballast material. Thus shielded, the ballast material need not necessarily be carried within a hollow internal space 58 of the structure but could even be external to the structure, provided that the structure carries the weight of the ballast material.

The ballast material may be flushed from the structure after the structure has been connected to a subsea installation for fluid communication with other subsea equipment. Thus, the ballast material is not necessarily evacuated directly into the sea but could instead be evacuated via a pipe or other equipment downstream of the structure, and from there into the sea. Similarly, the seawater that flushes the ballast material is not necessarily drawn directly from the sea but could instead be introduced via a pipe or other equipment upstream of the structure that draws in the seawater.

The invention claimed is:

1. A method of lowering and installing a hollow structure in water, comprising:
    temporarily carrying a denser-than-water ballast material on board the structure, the ballast material comprising a dry particulate solid, and the structure comprising at least one barrier that closes an internal space containing the ballast material;
    lowering the structure while carrying the ballast material, the ballast material being shielded from the water by the at least one barrier while the structure is lowered through the water towards a subsea location;
    anchoring the structure at the subsea location while carrying the ballast material;
    at the subsea location, dissolving, penetrating, or removing the barrier to expose the ballast material to a flushing flow of the water that promotes dissolution, suspension or dilution of the ballast material in the flushing flow of water while the ballast material is carried by the structure anchored at the subsea location to provide a solution or suspension entrained in the flushing flow of water; and
    removing the flushing flow of water and hence the dissolved, suspended or diluted ballast material from the structure.

2. The method of claim 1, wherein removing the ballast material prepares the structure to perform a primary function at the subsea location, distinct from a secondary function of carrying the ballast material.

3. The method of claim 2, wherein the primary function of the structure is that of a flowline for conveying fluids.

4. The method of claim 1, wherein some of the ballast material is removed from the structure by a mechanical structure selected from the group consisting of a wiper and a pig.

5. The method of claim 1, wherein a mass of the ballast material is exposed to the water flowing along one or more flow paths extending past or through the mass of ballast material.

6. The method of claim 1, comprising sensing a composition of effluent fluid containing the ballast material emanating from the structure.

7. A hollow structure arranged to be installed at a subsea location to perform a primary function, wherein the structure carries a denser-than-water ballast material that is dissolved, suspended or diluted in water at the subsea location while the ballast material is carried by the structure, and further wherein the ballast material is a substantially dry particulate solid material, and the structure comprises at least one barrier that closes an internal space containing the ballast material so as to shield the ballast material from the water while the structure is lowered through the water and to block access of the water to the ballast material before the structure reaches the subsea location, which barrier is arranged to be opened, dissolved, penetrated or removed to expose the ballast material to a flushing flow of the water when the structure is at the subsea location, so as to remove the dissolved, suspended or diluted ballast material from the structure as a solution or suspension entrained in the flushing flow of water.

8. The structure of claim 7, wherein the structure per se has positive or neutral buoyancy without the ballast material and the ballast material is present in sufficient quantity as to confer substantial negative buoyancy upon the structure as a whole, including the ballast material.

9. The structure of claim 7, comprising one or more flow paths through which the water may run, past or through a body of ballast material, in contact with the ballast material.

10. The structure of claim 7, comprising at least one sensor for sensing a composition of effluent fluid containing the ballast material emanating from the structure.

11. The structure of claim 7, comprising at least one valve arranged to control the flow of the water through the or at least one barrier.

12. The structure of claim 7, wherein the at least one barrier is positioned to protect parts of the structure from damage by the ballast material.

13. The structure of claim 7, comprising one or more pumps arranged to drive the flow of the water across or through the ballast material.

14. The structure of claim 13, wherein the one or more pumps comprise one or more of: an inlet pump on an inlet side of a flow path across or through the ballast material, and an outlet pump on an outlet side of the flow path to draw the water carrying the ballast material away from the structure.

* * * * *